Oct. 21, 1924.  
A. G. COOK, JR  
REVERSIBLE CLUTCH  
Filed Dec. 15, 1923  
1,512,878
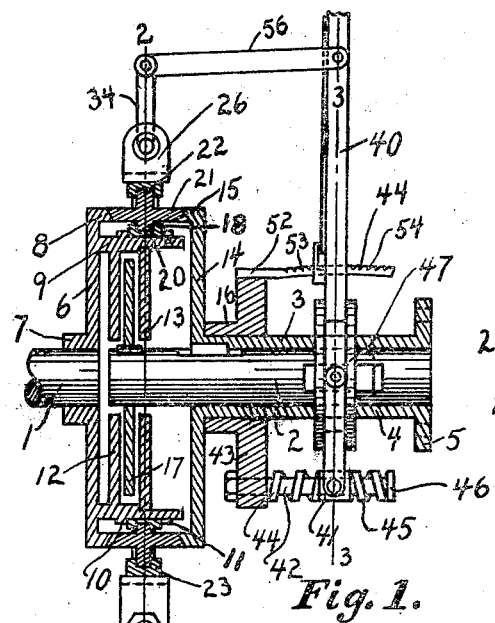
Fig. 1.
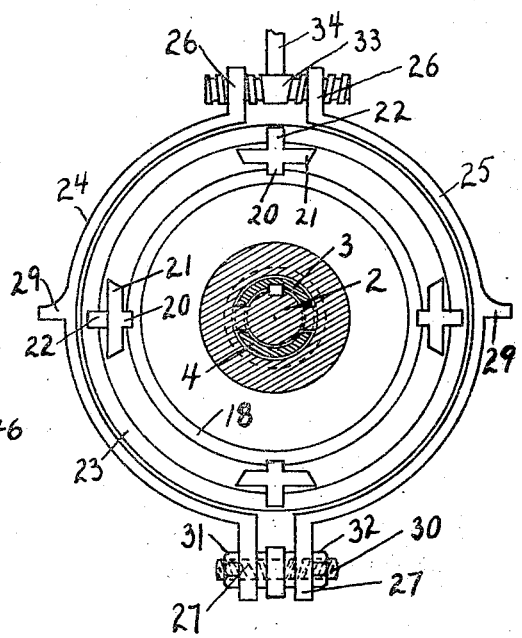
Fig. 2.
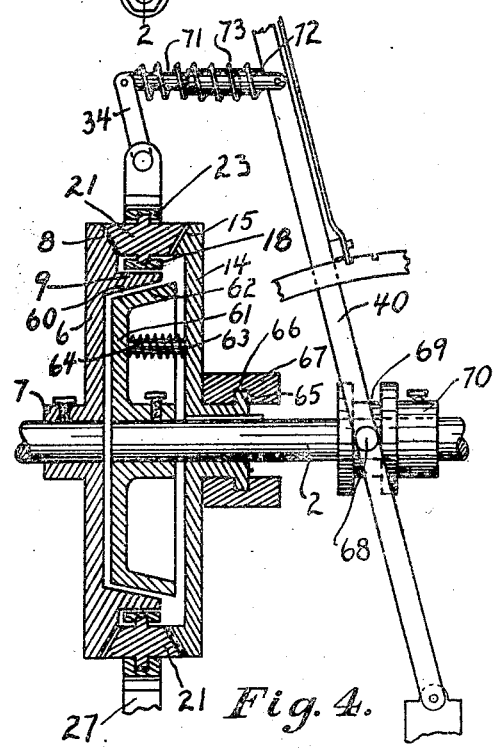
Fig. 4.
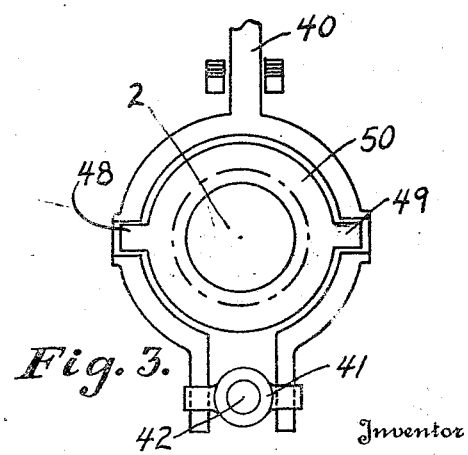
Fig. 3.
Inventor
A. G. Cook, Jr.
By 
Attorney Patented Oct. 21, 1924.

1,512,878

UNITED STATES PATENT OFFICE.

ALBERT GEORGE COOK, JR., OF MONROE, LOUISIANA.

REVERSIBLE CLUTCH.

Application filed December 15, 1923. Serial No. 680,861.

*To all whom it may concern:*

Be it known that I, ALBERT G. COOK, Jr., residing in the city of Monroe, parish of Ouachita, and State of Louisiana, and a citizen of the United States, have invented certain new and useful Improvements in Reversible Clutches, of which the following is a specification, reference being had to the accompanying drawing, forming a part thereof.

My invention relates to reversible clutches and has for its object to provide a simple, efficient and inexpensive clutch for connecting a driving shaft with a driven shaft in line with it so that the driven shaft will be rotated in the same direction with the driving shaft, or in the reverse direction, or to permit the driving shaft to rotate without rotating the driven shaft, and which will be particularly adapted for use in motor boats in which the propeller is operated by an internal combustion engine, or other engine, and in which a slight longitudinal movement of the propeller shaft may be permitted. A further object of my invention is to provide a clutch in which there will be no relative motion of the operating parts when the driven shaft is rotated with the driving shaft. A further object of the invention is to provide a clutch in which, when used in a motor boat, the thrust of the propeller when driving ahead will be made use of to ensure engagement of the clutch members and, when going astern, the back thrust will be made use of to prevent possible engagement of the clutch members by which the driving and driven shafts are connected for driving ahead. A further object of the invention is to provide a clutch which will be of comparatively light weight, will be self-contained, self-centering and self-adjusting, will have no small parts and will not be liable to wear or to get out of order.

With the objects above indicated, and other objects hereinafter described, in view my invention consists in the construction and combination of elements hereinafter described and claimed.

Referring to the drawings:—

Figure 1 is a longitudinal vertical sectional view of a clutch embodying my invention.

Figure 2 is a cross-sectional view on line 2—2 of Figure 1,

Figure 3 is a cross-sectional view on line 3—3 of Figure 1, and

Figure 4 is a longitudinal sectional view similar to Figure 1 but showing a modified form.

In the drawings 1 indicates the driving shaft which may be the engine shaft of an internal combustion engine or other engine. 2 indicates the driven shaft which, if the clutch is used in a motor boat, will be the propeller shaft to which the propeller may be secured either directly, as in Figure 4, or through sleeve strips 3 and 4 fitting in longitudinal grooves in the shaft 2 and carrying at their rear ends a flange 5 to which the propeller may be bolted or otherwise secured. Fast on the rear end of driving shaft 1 is a disc 6 having hub 7. On its rear face this disc is beveled at its periphery and provided with gear teeth to form bevel gear 8. Also on the rear face of this disc and within the line of the bevel gear is a rearwardly extending annular flange 9. In the form shown in Figure 1 this annular flange is provided on its outer face with annular guide ribs 10 and 11, of which guide rib 11 is removable, and on its inner face is provided with inwardly extending annular plates 12 and 13, of which annular plate 13 is removable. These annular plates extend inward nearly to the opening in the disc through which the shaft 1 extends.

On the driven shaft 2 opposite the disc 6 and of the same diameter with it is a disc 14 having on its forward face at its periphery gear teeth forming bevel gear 15 opposite to bevel gear 8 and corresponding with it in all respects except that it faces forward.

Disc 14 is carried by driven shaft 2 and is so mounted on it that the shaft will rotate with it but may move longitudinally through it. In the construction shown in Figures 1 and 2 the hub of this disc is formed integral with or secured to the sleeve strip 3 which is splined to the shaft and is held against rearward movement by a block 16 carried by the supporting framework in which the shaft and sleeve strips are journalled.

On the driven shaft 2 near its forward end is an outwardly extending ring 17 extending nearly to the inner face of flange 9 and having its forward face parallel with and adapted to have frictional engagement with the rear face of ring 12. It is fast on the driven shaft.

On the outer face of the flange 9, between the guide ribs 10 and 11, is carried a flat ring 18 which is normally free to rotate on the outer face of the flange. This ring 18 is provided with annular openings adapted to receive and serve as bearings for stub shafts 20 of bevel pinions 21, here shown as four in number, the teeth of which are in mesh with bevel gears 8 and 15. On their outer faces these bevel gears are provided with stub shafts 22 which have bearings in suitable openings in a flat ring 23 corresponding to ring 18 but of greater diameter. Outside ring 23 and adapted to be clamped upon it is a brake band formed of two parts 24 and 25 each having at its upper end an outwardly extending lug 26, at its lower end an outwardly extending lug 27, and, midway between its ends, an outwardly extending lug 29 for engagement with a stationary part of the supporting framework. The lugs 27 at the lower ends of the parts 24 and 25 are secured together by a bolt 30 which is preferably provided on one end with a right hand screwthread, and on the other end with a left hand screwthread and, at its midlength, with a squared portion adapted to be grasped by a wrench by which the bolt may be turned to cause the screwthreads to draw the lugs 27 closer together or to force them apart. Nuts 31 and 32 are carried on the lugs 27.

Lugs 26 at the upper ends of the parts 24 and 25 are each provided with a screw-threaded opening to receive the end of a clamping bolt 33 having one end provided with a right hand screwthread and the other end provided with a left hand screwthread, and having at its midlength a lever 34 by which it may be rotated to cause its screw-threaded ends to draw the lugs 26 together or to separate. When the lugs 26 are drawn together the parts 24 and 25 are caused to act as a brake band to hold the ring 23, and with it the bevel pinions 21 and ring 18, from rotating with the disc 6.

When the driven shaft is to be rotated in the same direction with the driving shaft the driven shaft is forced forward to bring the forward face of the flat ring 17 against the rear face of flat ring 12 carried by the flange 9 of disc 6. Through the frictional contact of the faces of these rings the driven shaft 2 is clutched to the driving shaft 1 so as to rotate with it. As the driven shaft is thus shifted longitudinally to bring the clutch member 17 against clutch member 12 the lever 34 is swung forward to cause the clamping bolt 33 to force the lugs 26 apart and to move the brake band parts 24 and 25 away from contact with the ring 23 so as to permit it to rotate freely. The ring 23 being thus free to rotate with the bevel pinions carried by it the bevel gear 8 will act upon these bevel pinions to rotate them but because the rings 18 and 23 in which their bearings are located are free to rotate about the flange 9 on which ring 18 rests, these pinions will travel upon the bevel gear 15 carrying rings 18 and 23 with them, without rotating disc 14.

When the driven shaft is to be rotated in a direction contrary to the direction of rotation of the driving shaft the lever 34 is swung rearward causing the clamping bolt 33 to draw the lugs 26 towards each other and to cause the parts 24 and 25 to clamp the ring 23 and prevent it, and the bevel pinions 21 and ring 18, from rotating about the axis of the shafts 1 and 2. Simultaneously with this clamping of the ring 23 the shaft 2 is moved longitudinally of its axis in a rearward direction to move ring 17 away from contact with ring 12. Ring 23 being thus held stationary the bevel pinions 21 will be rotated by bevel gear 8 and, being in mesh with bevel gear 15, will rotate it at the same speed as the disc 6 but in the opposite direction. The disc 14 which carries bevel gear 15 being splined to shaft 2 it will rotate this shaft with it.

When shaft 2 is midway between its forward and its rearward position its clutch member ring 17 will be out of contact with clutch member ring 12 and, lever 34 being in its intermediate position, the parts 24 and 25 of the brake band will be out of clamping contact with ring 23, and this ring, with the bevel pinions and ring 18, will be free to rotate about the axis if the two shafts and the rotation of these bevel pinions by the bevel gear 8 will not effect rotation of bevel gear 15.

Any convenient means may be employed for effecting the shifting of shaft 2 longitudinally of its axis. The means here shown comprises a hand lever 40 pivoted below the shaft 2, so connected with the shaft that the forward or rearward movement of the upper end of this lever will effect a corresponding movement of the shaft, and so connected near its upper end with lever 34 that its movement forward or rearward will swing this lever 34 forward or rearward. In the construction shown in Figure 1 the lower end of lever 40 is pivoted on a sleeve 41 carried on a rod 42 supported at its forward end in an arm 43 extending downward from fixed block 16. This sleeve 41 is held normally midway between the ends of rod 42 by means of strong coiled springs 44 and 45 on opposite sides of the sleeve, spring 44 bearing at one end against the forward end of the sleeve and at the other end against the arm 43 and the spring 45 bearing at one end against the rear end of the sleeve and at its other end bearing against a head 46 on the rear end of the rod. The lever 40 is so formed, as shown in Figure 3, as to embrace the shaft 2 and the sleeve strips carried by it and is provided in line with the axis of the shaft with openings adapted to receive trunnions 48 and 49 carried by a ring 50 in which shaft 2 may rotate freely but which is so engaged with the shaft that the shaft will move longitudinally of its axis with it.

Above the shaft 2 and carried by a fixed part of the frame is a segment 52 provided with teeth 53 and 54 with which a spring detent of usual construction carried by lever 40 is adapted to engage, the detent being adapted to be released by the usual hand lever.

Near its upper end lever 40 is connected by link 56 to the upper end of lever 34 so that as the lever is swung rearward from its intermediate position it will swing the lever 34 rearward to effect the clamping of the brake band on the ring 23 as above described and, when swung forward of its intermediate position, will swing lever 34 forward to separate the parts 24 and 25 of the brake band.

The ring 13 serves to prevent the entrance of foreign matter which might work into the space between the clutch member rings 12 and 17 and prevent the close contact of their adjacent faces which is necessary for ensuring rotation of clutch member 17 by clutch member 12. This ring 13 is not, however, necessary to the operation of the clutch and may be dispensed with.

In the construction shown in Figure 4 the discs 6 and 14 with their bevel gears 8 and 15, the bevel pinions 21 and the rings 18 and 23 which carry them and the brake band by which these rings and the bevel pinions carried by them, are held stationary, are the same as in the construction shown in Figure 1. But instead of the clutch member ring 12 the flange 9 is provided on its inner face with a conical face 60, and instead of the clutch member ring 17 carried by the driven shaft 2 this shaft carries a disc 61 having on its periphery a conical face 62 adapted to engage the conical face 60 and this disc 61 is pressed away from disc 14 by springs 63 carried on rods 64. In this construction shown in Figure 4 the disc 14 is splined directly to shaft 2 and is held from movement longitudinal of the shaft by a ring 65 formed on the hub of the disc and engaging an annular groove 66 in the bearing block 67, and the lever 40 is provided with pins 68 which engage an annular groove 69 in a sleeve 70 secured on shaft 2. The lower end of the lever 40, in this construction, is pivoted in a fixed part of the frame and the connection between the lever 34 and the lever 40 is made yielding, consisting of an inner member 71 pivoted at its forward end to lever 34 telescoping into an outer member 72 pivoted at its rear end to lever 40, a coiled spring 73 enclosing the outer and inner members 71 and 72 and secured at its forward and rear ends respectively to the lever 34 and the lever 40.

Having thus described my invention what I claim is:

1. In a reversing clutch the combination with a driving shaft and a driven shaft in line therewith and arranged to be longitudinally movable, of a main clutch member carried by the driving shaft having a bevel gear near its periphery, a reversing disk rotating with the driven shaft but held against longitudinal movement having a bevel gear near its periphery opposite the bevel-gear on the main clutch member, an inner clutch member between the main clutch member and the reversing disk, a ring between the main clutch member and the reversing disk supported by the main clutch member but freely movable in reference thereto, gears carried by the ring between and engaging the bevel gears of the main clutch member and the reversing disk, means for moving the driven shaft longitudinally to shift the inner clutch member into and out of engagement with the main clutch member and means for holding the ring carrying the gears against rotation.

2. In a reversing clutch the combination with a driving shaft and a driven shaft in line therewith arranged to be longitudinally movable and having a propeller at its rear end, of a main clutch member carried by the driving shaft having a bevel gear near its periphery, a reversing disk rotating with the driven shaft but held against longitudinal movement having a bevel gear near its periphery opposite the bevel gear on the main clutch member, an inner clutch member between the main clutch member and the reversing disk, a ring between the main clutch member and the reversing disk supported by the main clutch member but freely movable in reference thereto, gears carried by the ring between and engaging the bevel gears of the main clutch member and the reversing disk, means for moving the driven shaft against the thrust of the propeller to release the inner clutch member from engagement with the main clutch member and for simultaneously holding the ring carrying the gears against rotation.

3. In a reversing clutch the combination with a driving shaft and a driven shaft in line therewith and arranged to be longitudinally movable, of a main clutch member carried by the driving shaft having a bevel gear near its periphery, a reversing disk rotating with the driven shaft but held against longitudinal movement having a bevel gear near its periphery opposite the bevel gear on the main clutch member and the reversing disk carried by the driven shaft, a ring between the main clutch member and the reversing disk supported by the main clutch member but freely movable in reference thereto, gears carried by the ring between and engaging the bevel gears of the main clutch member and the reversing disk, a brake band for the ring, a lever for tightening the brake band to hold the ring against rotation, an operating lever for moving the driven shaft longitudinally to disengage the inner clutch member from the main clutch member, pivoted at its lower end below the horizontal plane of the axis of the driven shaft on a pivot mounted to yield on a line parallel with the axis of the driven shaft.

In testimony whereof I hereunto affix my signature.

ALBERT GEORGE COOK, Jr.